(12) United States Patent
Yang

(10) Patent No.: US 11,487,173 B2
(45) Date of Patent: Nov. 1, 2022

(54) DISPLAY PANEL, REPAIR METHOD FOR DISPLAY PANEL AND DISPLAY DEVICE

(71) Applicants: HKC CORPORATION LIMITED, Shenzhen (CN); CHONGQING HKC OPTOELECTRONICS TECHNOLOGY CO., LTD., Chongqing (CN)

(72) Inventor: Yanna Yang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/289,247

(22) PCT Filed: Mar. 11, 2020

(86) PCT No.: PCT/CN2020/078748
§ 371 (c)(1),
(2) Date: Apr. 28, 2021

(87) PCT Pub. No.: WO2020/192422
PCT Pub. Date: Oct. 1, 2020

(65) Prior Publication Data
US 2021/0397055 A1 Dec. 23, 2021

(30) Foreign Application Priority Data
Mar. 22, 2019 (CN) .......................... 201910219911.6

(51) Int. Cl.
*G02F 1/1362* (2006.01)

(52) U.S. Cl.
CPC .. *G02F 1/136259* (2013.01); *G02F 1/136227* (2013.01); *G02F 1/136286* (2013.01)

(58) Field of Classification Search
CPC .................................................. G02F 1/136259
See application file for complete search history.

(56) References Cited

U.S. PATENT DOCUMENTS

2001/0005252 A1* 6/2001 Lee .................... G02F 1/134363
349/139
2006/0050219 A1 3/2006 Lee
(Continued)

FOREIGN PATENT DOCUMENTS

CN 101299124 A 11/2008
CN 101399272 A 4/2009
(Continued)

OTHER PUBLICATIONS

Yali Liu, the ISA written comments, May 2020, CN.
Yali Liu, the International Search Report, May 2020, CN.

*Primary Examiner* — Sang V Nguyen

(57) ABSTRACT

The present application discloses a display panel, a repair method for the display panel and a display device, where a repair line includes a first repair point, a second repair point and a third repair point which overlap with a data line, the first repair point is located on a side of a first overlapping area away from the second repair point, the second repair point is located between the first overlapping area and a second overlapping area, and the third repair point is located on a side of the second overlapping area away from the second repair point.

12 Claims, 5 Drawing Sheets

(56) References Cited

U.S. PATENT DOCUMENTS

| | | | |
|---|---|---|---|
| 2020/0004090 A1* | 1/2020 | Yoshida | G06F 3/0412 |
| 2021/0173269 A1* | 6/2021 | Li | G02F 1/1368 |
| 2021/0397055 A1* | 12/2021 | Yang | G02F 1/136286 |

FOREIGN PATENT DOCUMENTS

| | | | | |
|---|---|---|---|---|
| CN | 109510919 | * | 7/2009 | G02F 1/136 |
| CN | 102998869 | * | 3/2013 | G02F 1/1362 |
| CN | 102998869 A | | 3/2013 | |
| CN | 106681036 A | | 5/2017 | |
| CN | 107463038 A | | 12/2017 | |
| CN | 109491115 | * | 3/2019 | G02F 1/13 |
| CN | 109856878 A | | 6/2019 | |

* cited by examiner

DISPLAY PANEL, REPAIR METHOD FOR DISPLAY PANEL AND DISPLAY DEVICE

CROSS REFERENCE OF RELATED APPLICATIONS

The present application claims the priority to the Chinese Patent Application No. CN201910219911.6, filed to National Intellectual Property Administration, PRC on Mar. 22, 2019 and entitled "DISPLAY PANEL, REPAIR METHOD FOR DISPLAY PANEL AND DISPLAY DEVICE", which is incorporated herein by reference in its entirety.

TECHNICAL FIELD

The present application relates to the field of display technologies, particularly to a display panel, a repair method for the display panel and a display device.

BACKGROUND

The statements herein merely provide background information related to the present application and do not necessarily constitute the conventional art. With the development and advancement of science and technology, display panel has become the mainstream of display products due to its thin body, low power consumption and low radiation, and has been widely used. Display panel includes a Thin Film Transistor-Liquid Crystal Display (TFT-LCD). TFT-LCD refracts light rays of backlight modules to generate pictures by controlling the rotation direction of liquid crystal molecules, and has many advantages, such as thin body, low power consumption, and no radiation and the like.

In the manufacturing process of the display panel, due to environment or machine equipment factors, a short circuit often occurs in an overlapping area of the data lines and the scanning lines, or a short circuit often occurs in an overlapping area of the data lines and the common electrodes, so that the product yield is reduced, and the cost is wasted.

SUMMARY

The purpose of the present application is to provide a display panel, a repair method for the display panel and a display device, so as to improve yield of display panels.

The present application discloses a display panel, which includes a substrate, a plurality of active switches disposed on the substrate, a plurality of data lines disposed on the substrate and connected with source electrodes of the active switches, a plurality of scanning lines disposed on the substrate and connected with gate electrodes of the active switches, a plurality of pixel electrodes disposed on the substrate and connected with drain electrodes of the active switches, a plurality of common lines disposed on the substrate and overlapping with the pixel electrodes, and a plurality of repair lines disposed on the substrate; where insulation layers are formed between the repair line and the data line, the scanning line and the common line, and the data line overlaps with the common line to form a first overlapping area, and the data line overlaps with the scanning line to form a second overlapping area. The repair line includes a first repair point, a second repair point and a third repair point overlapping with the data line, the first repair point is located on a side of the first overlapping area away from the second repair point, the second repair point is located between the first overlapping area and the second overlapping area, and the third repair point is located on a side of the second overlapping area away from the second repair point.

The present application also discloses a display panel, which includes a substrate, a plurality of active switches disposed on the substrate, a plurality of data lines disposed on the substrate and connected with source electrodes of the active switches, a plurality of scanning lines disposed on the substrate and connected with gate electrodes of the active switches, a plurality of pixel electrodes disposed on the substrate and connected with drain electrodes of the active switches, a plurality of common lines disposed on the substrate and overlapping with the pixel electrodes, and a plurality of repair lines disposed on the substrate; where insulation layers are formed between the repair line and the data line, the scanning line and the common line, and the data line overlaps with the common line to form a first overlapping area, and the data line overlaps with the scanning line to form a second overlapping area.

The repair line includes a first repair point, a second repair point and a third repair point overlapping with the data line, the first repair point is located on a side of the first overlapping area away from the second repair point, the second repair point is located between the first overlapping area and the second overlapping area, and the third repair point is located on a side of the second overlapping area away from the second repair point.

At least two of the first repair point, the second repair point and the third repair point are electrically connected with the data line at the overlapping portion with the data line; the data line has at least two first breakpoints, the first breakpoints are located within a position interval where the data line is electrically connected with the repair line, and at least one of the first overlapping area and the second overlapping area is located between the first breakpoints.

The present application also discloses a repair method for a display panel, including steps of:

detecting a position of a short-circuit point;

electrically connecting the data line with at least two of the first repair point, the second repair point and the third repair point according to the position of the short-circuit point; and cutting off the data line to form at least two first breakpoints;

where the first breakpoints are located within a position interval where the data line is electrically connected with the repair line, and at least one of the first overlapping area and the second overlapping area is located between the first breakpoints.

On the display panel, the insulation layer between the data line and the common line in the first overlapping area and the insulation layer between the data line and the scanning line in the second overlapping area are often prone to cause short circuit between the data line and the common line or short circuit between the data line and the scanning line due to poor film formation; or a lot of conductive particles are generated in the manufacturing process of the display panel, and fall on the insulation layers between the first overlapping area and the second overlapping area, which is prone to caused short circuit between the data line and the common line or short circuit between the data line and the scanning line.

The present application provides a repair line located in an area around a first overlapping area and a second overlapping area, a first repair point, a second repair point and a third repair point of the repair data overlap with a data line, the first repair point is located on a side of the first overlapping area away from the second repair point, the second repair point is located between the first overlapping area and the second overlapping area, and the third repair point is located on a side of the second overlapping area away from the second repair point. When short circuit occurs at any one of the first overlapping area and the second overlapping area or short circuit occurs at the first overlapping area and the second overlapping area, the short-circuited part in the data line can be cut off, the repair line is electrically connected with the data line again, then the data line can work normally again, which repairs panels and improve yield of the display panels.

BRIEF DESCRIPTION OF DRAWINGS

The accompanying drawings, which are included to provide a further understanding of embodiments of the present application and constitute a part of the specification, illustrate embodiments of the present application and, together with the text description, explain the principles of the present application. Obviously, the drawings in the following description are merely some embodiments of the present application, and those skilled in the art can obtain other drawings according to the drawings without any inventive labor. In the drawings.

DETAILED DESCRIPTION OF EMBODIMENTS

It should be understood that the terminology, specific structural and functional details disclosed are merely exemplary for the purpose of describing specific embodiments. However, the present application may be embodied in many alternative forms and should not be construed as being limited to the embodiments set forth herein.

In the description of the present application, the terms "first" and "second" are only for the purpose of description and cannot be construed to indicate relative importance or imply an indication of the number of technical features indicated. Therefore, unless otherwise stated, a feature defined as "first" and "second" may explicitly or implicitly include one or more of the features; "multiple" means two or more. The term "include" and any variations thereof are intended to be inclusive in a non-closed manner, that is, the presence or addition of one or more other features, integers, steps, operations, units, components and/or combinations thereof may be possible.

In addition, the terms "center", "transverse", "up", "down", "left", "right", "vertical", "horizontal", "top", "bottom", "inner", "outer" and the like for indicating an orientation or positional relationship are based on the description of the orientation or relative positional relationship shown in the accompanying drawings, and are only simplified description facilitating description of the application, and are not intended to indicate that the device or element referred to must have a particular orientation, be configured and operated in a particular orientation, and therefore cannot be construed as limiting the present application.

In addition, unless expressly specified and defined otherwise, the terms "mount", "attach" and "connect" are to be understood broadly, for example, it can be a fixed connection, a detachable connection, or an integral connection; it can be an either mechanical connection or an electrical connection; it can be a direct connection or an indirect connection through an intermediate medium, or an internal connection between two elements. For those skilled in the art, the specific meaning of the above terms in this application can be understood according to the specific circumstances.

The present application will now be described in details by reference to FIGS. 1 to 9 and optional embodiments.

Figure 1:
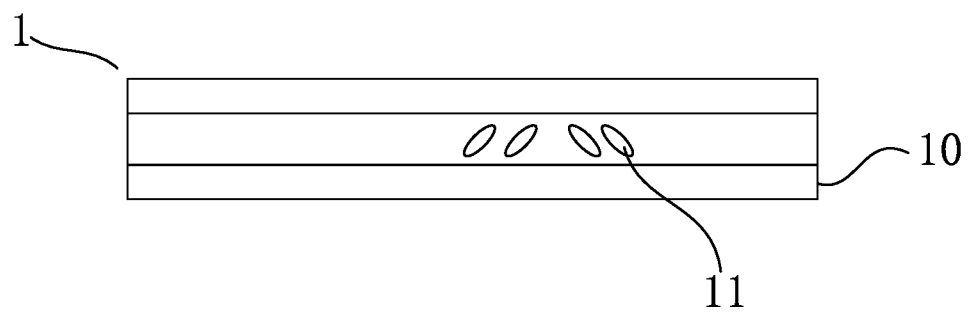
FIG. 1 is a schematic diagram of a display panel according to an embodiment of the present application.
Figure 2:
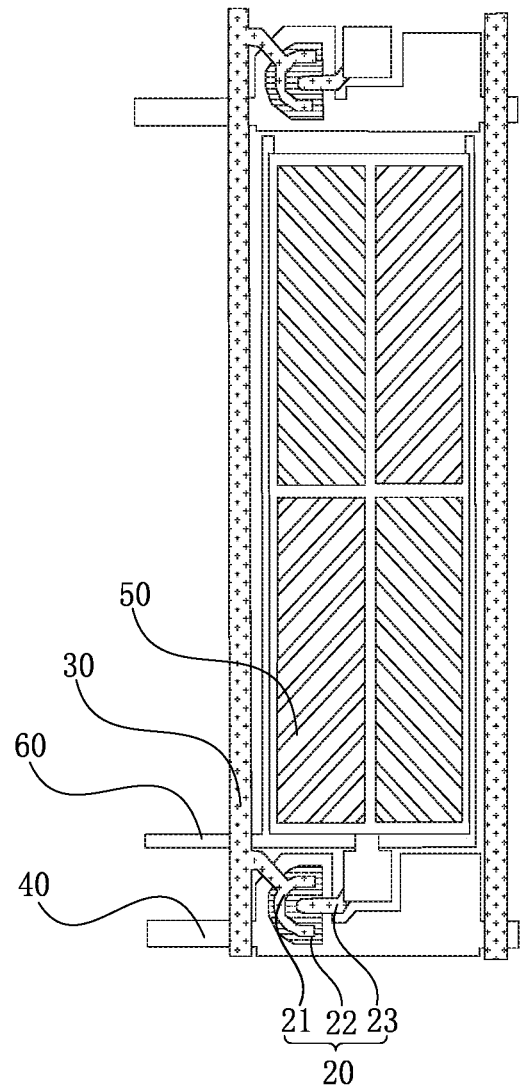
FIG. 2 is a schematic diagram of a data line, a scanning line and a common line according to an embodiment of the present application.

The embodiment of the present application discloses a display panel. FIG. 1 shows a display panel. FIG. 2 shows a data line 30 overlapping with a common line 60 and a scanning line 40, the display panel 1 includes a substrate 10, a plurality of active switches 20 disposed on the substrate 10, a plurality of data lines 30 disposed on the substrate 10 and connected with source electrodes 21 of the active switches 20, a plurality of scanning lines 40 disposed on the substrate 10 and connected with gate electrodes 22 of the active switches 20, a plurality of pixel electrodes 50 disposed on the substrate 10 and connected with drain electrodes 23 of the active switches 20, and a plurality of common lines 60 disposed on the substrate 10 and overlapping with pixel electrodes 50.

Figure 3:
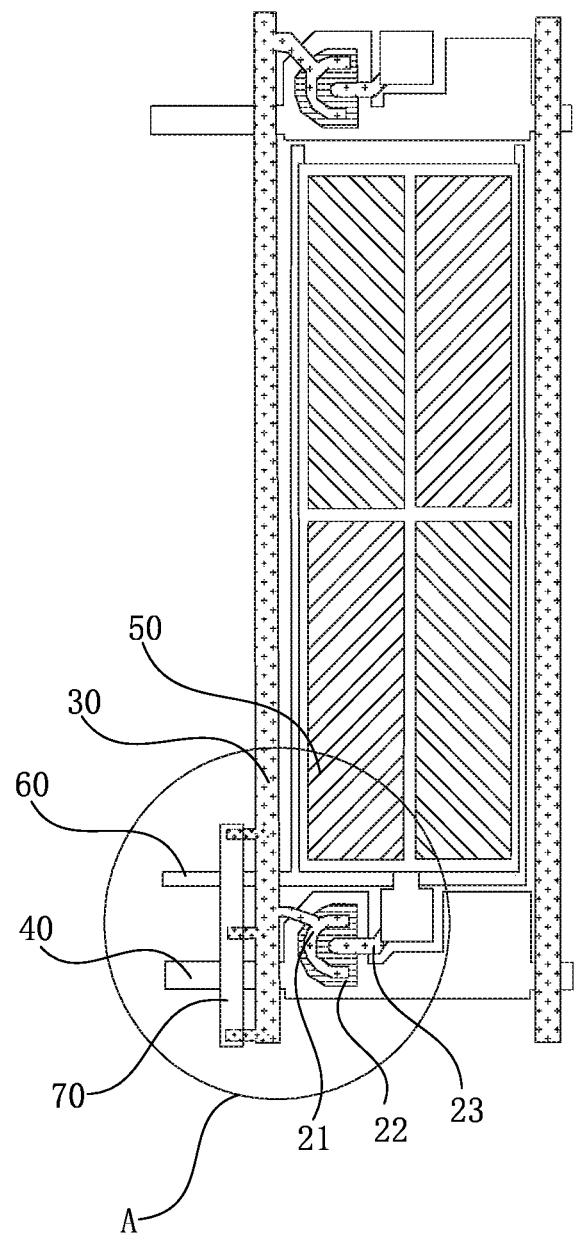
FIG. 3 is a schematic diagram of a repair line according to an embodiment of the present application.

As shown in a schematic diagram of a repair line 70 in FIG. 3, the display panel 1 further includes a repair line 70, the repair line 70 is disposed on the substrate 10, and the repair line 70 may be conductive.

Figure 4:
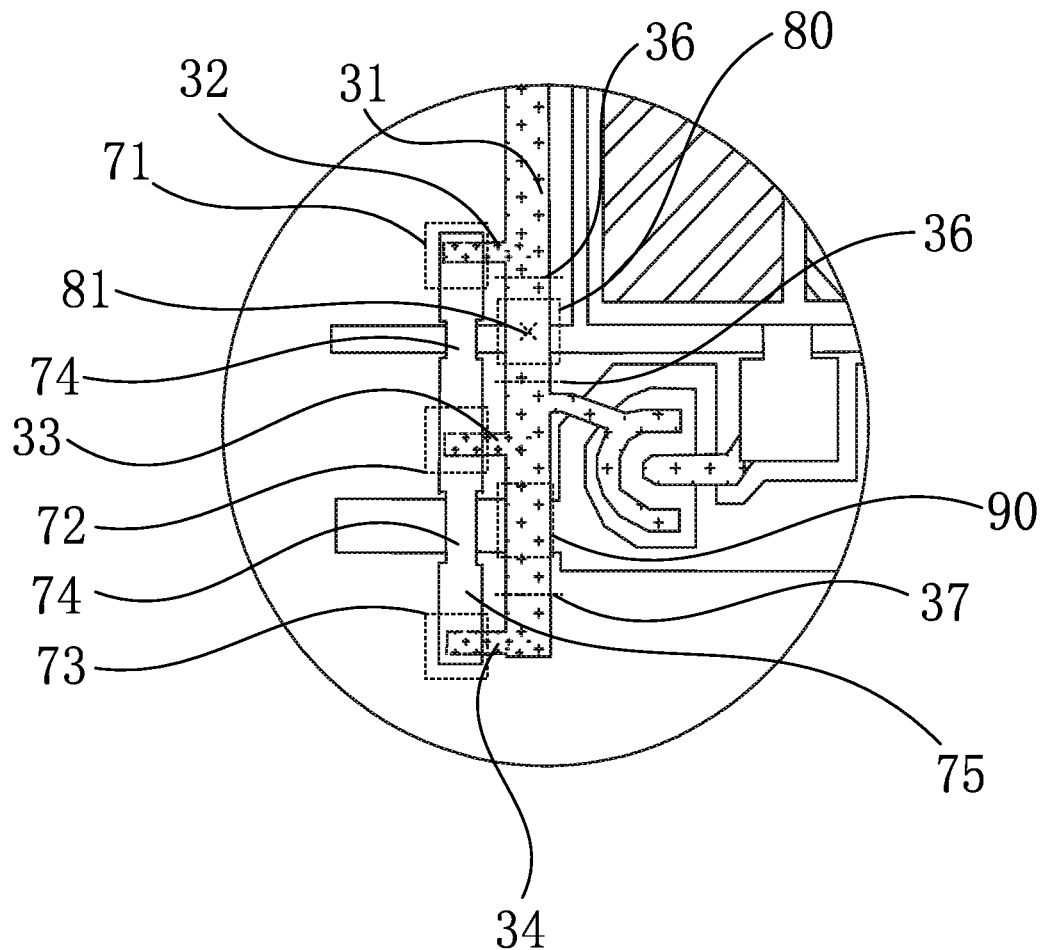
FIG. 4 is a partial enlarged diagram of portion A of FIG. 3.
Figure 5:
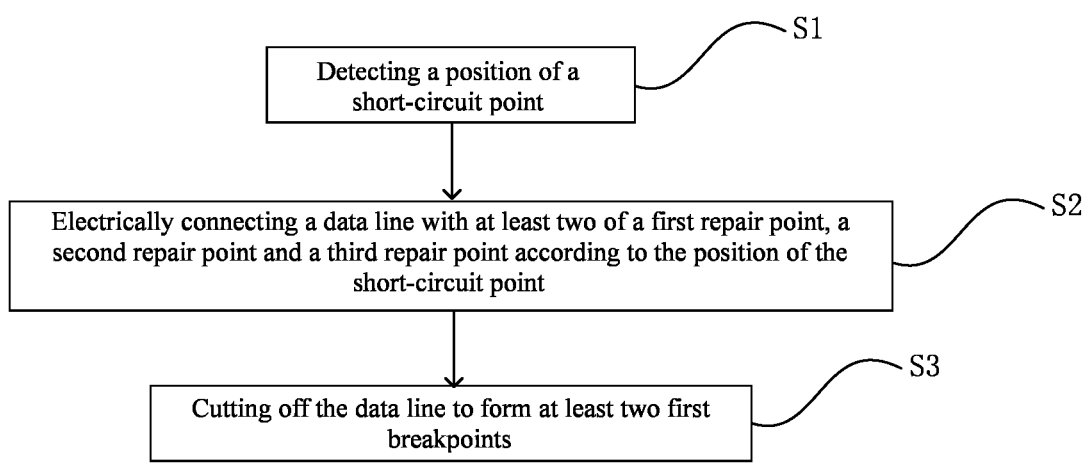
FIG. 5 is a flow schematic view of a repair method according to an embodiment of the present application.

Insulation layers are formed between the repair line 70 and the data line 30, the scanning line 40 and the common line 60;

specifically, as shown in the detail enlarged diagram of FIG. 3 in FIG. 4, the data line 30 overlaps with the common line 60 to form a first overlapping area 80, and the data line 30 overlaps with the scanning line 40 to form a second overlapping area 90;

the repair line 70 includes a first repair point 71, a second repair point 72 and a third repair point 73 overlapping with a data line 30, the first repair point 71 is located on a side of the first overlapping area 80 away from the second repair point 72, the second repair point 72 is located between the first overlapping area 80 and the second overlapping area 90, and the third repair point 73 is located on a side of the second overlapping area 90 away from the second repair point 72.

On the display panel 1, the insulation layer between the data line 30 and the common line 60 in the first overlapping area 80 and the insulation layer between the data line 30 and the scanning line 40 in the second overlapping area 90 are often prone to cause short circuit between the data line 30 and the common line 60 or short circuit between the data line 30 and the scanning line 40 due to poor film formation; or a lot of conductive particles are generated in the manufacturing process of the display panel 1, and fall on the insulation layers between the first overlapping area 80 and the second overlapping area 90, which is prone to caused short circuit between the data line 30 and the common line 60 or short circuit between the data line 30 and the scanning line 40.

The present application provides a repair line 70 located in an area around a first overlapping area 80 and a second overlapping area 90, a first repair point 71, a second repair point 72 and a third repair point 73 of the repair data 70 overlaps with a data line 30, the first repair point 71 is located on a side of the first overlapping area 80 away from the second repair point 72, the second repair point 72 is located between the first overlapping area 80 and the second overlapping area 90, and the third repair point is 73 located on a side of the second overlapping area 90 away from the second repair point 72. When short circuit occurs at any one of the first overlapping area 80 and the second overlapping area 90 or short circuit occurs at the first overlapping area 80 and the second overlapping area 90, the short-circuited part in the data line 30 can be cut off, the repair line 70 is electrically connected with the data line 30 again, then the data line 30 can work normally again, which repairs panels and improve yield of the display panels 1.

For example, when short circuit occurs at the first overlapping area 80, the data line 30 between the first overlapping area 80 and the first repair point 71 and the data line 30 between the first overlapping area 80 and the second overlapping area 90 can be cut off to form two non-conductive first breakpoints 36, and meanwhile, the first repair point 71 is electrically connected with the data line 30 and the third repair point 73 is electrically connected with the data line 30; the data line 30 between the first overlapping area 80 and the first repair point 71 and the data line 30 between the first overlapping area 80 and the second repair point 72 can also be cut off to form two non-conductive first breakpoints 36, and meanwhile, the first repair point 71 is electrically connected with the data line 30, and the second repair point 72 is electrically connected with the data line 30; which ensures bypassing the short-circuited first overlapping area 80 and allowing the data line 30 to operate normally.

For example, when short circuit occurs at the second overlapping area 90, the data line 30 between the second overlapping area 90 and the third repair point 73 and the data line 30 between the second overlapping area 90 and the second repair point 72 can be cut off to form two non-conductive first breakpoints 36, and meanwhile, the second repair point 72 is electrically connected with the data line 30 and the third repair point 73 is electrically connected with the data line 30; the data line 30 between the second overlapping area 90 and the third repair point 73 and the data line 30 between the first overlapping area 90 and the first repair point 71 can also be cut off to form two non-conductive first breakpoints 36, and meanwhile, the first repair point 71 is electrically connected with the data line 30, and the third repair point 73 is electrically connected with the data line 30; which ensures bypassing the short-circuited second overlapping area 90 and allowing the data line 30 to operate normally.

For example, when short-circuit occurs at both the first overlapping area 80 and the second overlapping area 90, the data line 30 between the first overlapping area 80 and the first repair dot 71 is cut off, and the data line 30 between the second overlapping area 90 and the third repair dot 73 is cut off, so as to form two non-conductive first breakpoints 36, and meanwhile, the first repair point 71 is electrically connected with the data line 30, and the third repair point 73 is electrically connected with the data line 30; which ensures bypassing the short-circuited first overlapping area 80 and second overlapping area 90 and allowing the data line 30 to operate normally.

As long as the short-circuit point 81 is formed when short circuit occurs at the first overlapping area 80, the second overlapping area 90, and both the first overlapping area 80 and the second overlapping area 90, the present embodiment is feasible that the data line 30 is reconnected by the first repair point 71, the second repair point 72 and the third repair point 73. According to the present embodiment, when short circuit occurs at the first overlapping area 80 or the second overlapping area 90, various repairing combinations can be chosen, and meanwhile, when short circuit occurs at both the first overlapping area 80 and the second overlapping area 90, the data line 30 may also be repaired by the repair line 70.

When short-circuit occurs at the data line 30 in the present embodiment, for example, the position of the data line 30 to be cut off may be cut off by laser cutting, and the insulation layer between the overlapping areas of the first repair point 71, the second repair point 72, the third repair point 73 and the data line 30 is perforated, and welding is performed to electrically connect the data line 30 with any combination of the first repair point 71, the second repair point 72, and the third repair point 73. As shown in a flowchart of a repair method in FIG. 5, the specific repair method includes steps of:

S1: detecting a position of a short-circuit point;
S2: electrically connecting a data line with at least two of a first repair point, a second repair point and a third repair point according to the position of the short-circuit point; and
S3: cutting the data line to form at least two first breakpoints.

The first breakpoint 36 is located within a position interval where the data line 30 is electrically connected with the repair line 70, and at least one of the first overlapping area 80 and the second overlapping area 90 is located between the first breakpoints 36.

In the display panel 1 repaired by the repair method, at least two of the first repair point 71, the second repair point 72 and the third repair point 73 are electrically connected with the data line 30 at the overlapping portion with the data line 30; the data line 30 has at least two non-conductive first breakpoints 36 formed by cutting (in the embodiment, the first breakpoints 36 are intentionally formed, a short-circuit point 81 is formed after short circuit occurs at the first overlapping area 80 and the second overlapping area 90, and a short-circuit point 81 is formed when the data line 30 is broken), the first breakpoint 36 is located within a position interval where the data line 30 is electrically connected with the repair line 70, and at least one of the first overlapping area 80 and the second overlapping area 90 is located between the first breakpoints 36.

Figure 6:
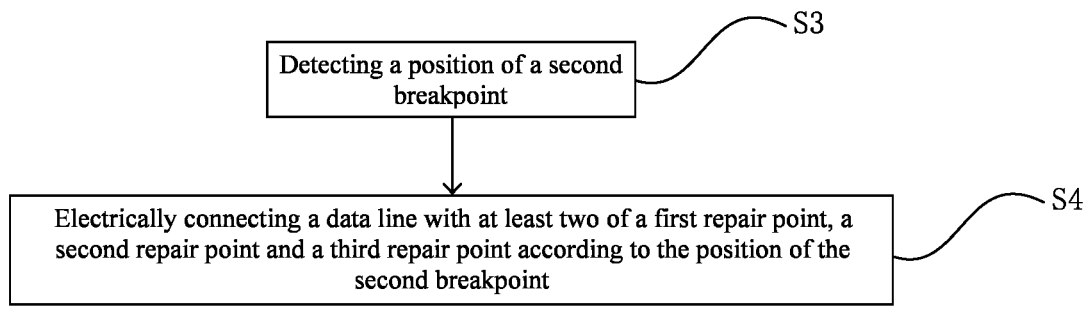
FIG. 6 is a flow schematic view of another repair method according to an embodiment of the present application.

It can be referred from the above that when the data line 30 in the area between the first repair point 71 and the second repair point 72 is broken due to manufacturing process to form a non-conductive second breakpoint 37, the second breakpoint 37 can also be repaired by a method similar to the above-mentioned method, specifically, as shown in a flowchart of a repair method in FIG. 6, the repair method includes the steps of:

S4: detecting a position of a second breakpoint; and
S5: electrically connecting a data line with at least two of a first repair point, a second repair point and a third repair point according to the position of the second breakpoint.

The second breakpoint 37 is located within a position interval where the data line 30 is electrically connected with the repair line 70.

The present method is different from the above-mentioned method in that the present method is applicable to repairing the circuit-break of the data line 30. In the display panel 1 repaired by the present method, at least two of the first repair point 71, the second repair point 72 and the third repair point 73 are electrically connected with the data line 30 at the overlapping portion with the data line 30; the second breakpoint 37 is located within a position interval where the data line 30 is electrically connected with the repair line 70.

Specifically, the repair line 70 overlaps with the common line 60 and the scanning line 40; an overlapping portion 74 is an area 74 where the repair line 70 overlaps with the common line 60 and the scanning line 40 and a staggered portion 75 is a non-overlapping area; the width of the overlapping portion 74 is smaller than the width of the staggered portion 75.

The capacitance is easily generated in the overlapping portion 74 of the repair line 70, the common line 60 and the scanning line 40, affecting the signal transmission; in the present embodiment, the width of the overlapping portion 74 is smaller than that of the staggered portion 75, so that the overlapping area of the repair line 70, the common line 60 and the scanning line 40 is reduced, the capacitance is reduced, and the signal transmission is more stable.

In another embodiment, the data line 30 includes a data line main body 31, a first branch line 32, a second branch line 33 and a third branch line 34, the first branch line 32, the second branch line 33 and the third branch line 34 are connected with the data line main body 31 and protrude from the data line main body 31; the first branch line 32 is located on a side of the first overlapping area 80 away from the second repair point 72, and corresponds to and overlaps with the first repair point 71; the second branch line 33 is located between the first overlapping area 80 and the second overlapping area 90, and corresponds to and overlaps with the second repair point 72; the third branch line 34 is located on a side of the second overlapping area 90 away from the second repair point 72, and corresponds to and overlaps with the third repair point 73; the data line main body 31 is staggered with the repair line 70.

The data line main body 31 is staggered from the repair line 70, no overlapping area is formed, capacitance is not easily generated between the data line main body and the repair line, and signals of the repaired repair line 70 and data line 30 are stable.

Figure 7:
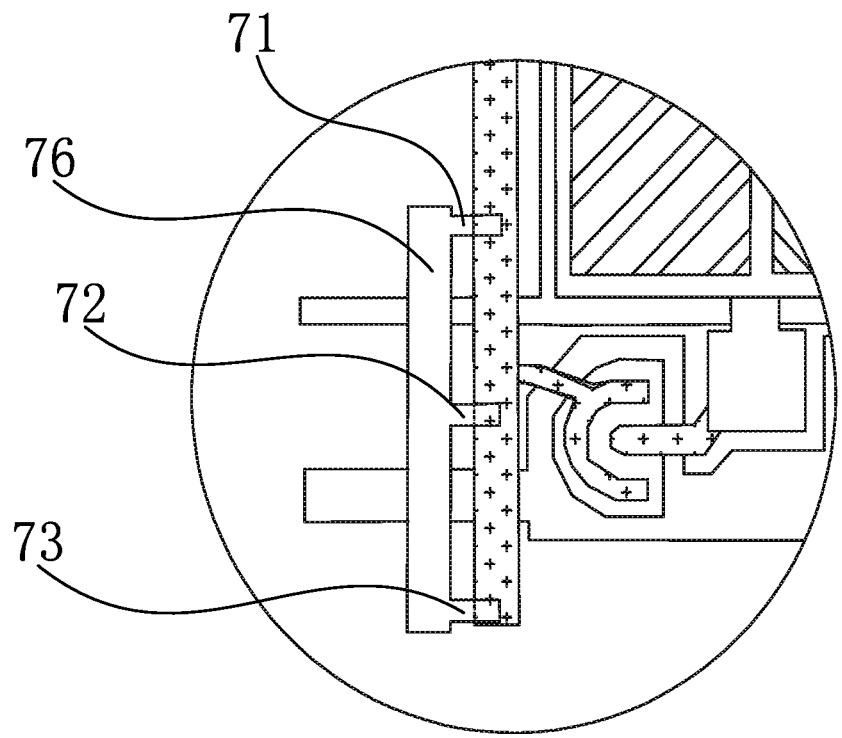
FIG. 7 is a schematic diagram of another repair line according to an embodiment of the present application.

As shown in FIG. 7, the repair line 70 includes a repair line main body 76, and the repair line main body 76 is connected with the first repair point 71, the second repair point 72 and the third repair point 73; the first repair point 71, the second repair point 72 and the third repair point 73 protrude from the data line main body 31; the first repair point 71 is located on a side of the first overlapping area 80 away from the second repair point 72 and overlaps with the data line 30; the second repair point 72 is located between the first overlapping area 80 and the second overlapping area 90 and overlaps with the data line 30; the third repair point 73 is located on a side of the second overlapping area 90 away from the second repair point 72 and overlaps with the data line 30; the data line 30 is staggered with the repair line main body 76.

The data line 30 is staggered from the repair line main body 76, no overlapping area is formed, capacitance is not easily generated between the data line main body and the repair line, and signals of the repaired repair line 70 and data line 30 are stable.

The repair line 70 may be disposed at a side of the data line 30 away from the pixel electrode 50.

The number of metal wires on the left side of the data line 30 is small, the repair line 70 is disposed on the left side of the data line 30, therefore, the overlapping area formed by the repair line 70 and the metal wires on the left side of the data line 30 is small, the generated parasitic capacitance is small, and the influence on the signals of the repaired repair line 70 and metal wires is small.

Specifically, a side of the data line main body 31 away from the pixel electrode 50 is a left side of the data line 30, and a side close to the pixel electrode 50 is a right side of the data line 30. The first branch line 32, the second branch line 33 and the third branch line 34 are connected to the left side of the data line main body 31, and the repair lines 70 are correspondingly disposed on the left side of the data line main body 31.

In addition, the first branch line 32, the second branch line 33 and the third branch line 34 are connected to the left side of the data line main body 31, the second branch line 33 is connected with the source electrode 21 at the same time, and the repair lines 70 are correspondingly disposed on the left side of the data line main body 31.

The repair line 70 is correspondingly disposed at the right side of the data line main body 31, and the second branch line 33 is connected with the source electrode 21 and plays a role of repairing when short circuit occurs.

Specifically, the repair line 70 is staggered from the source electrode 21, the gate electrode 22, and the drain electrode 23, so that capacitance is not easily generated, and signals of the repaired repair line 70, the source electrode 21, the gate electrode 22 and the drain electrode 23 are stable.

The repair line 70 may be a straight line with a short length and a small resistance, thereby reducing a resistance-capacitance delay (RC delay).

In another embodiment, the width of the data line 30 may be the same as that of the repair line 70, so that after the short-circuited area of the data line 30 is repaired by the repair line 70, the resistance value of the replaced repair line 70 is closer to that of data line 30 in the original short-circuited area, the overall resistance value of the data line 30 changes little, which has less influence on signal transmission.

The width of the repair line 70 may also be less than that of the data line main body 31, which ensures small occupied space and better transmittance.

The width of the repair line 70 may also be greater than that of the data line main body 31.

In another embodiment, the width of the repair line 70 may be greater than 4 μm, which ensures that the repair line 70 has sufficient width and is not easily break.

Figure 8:
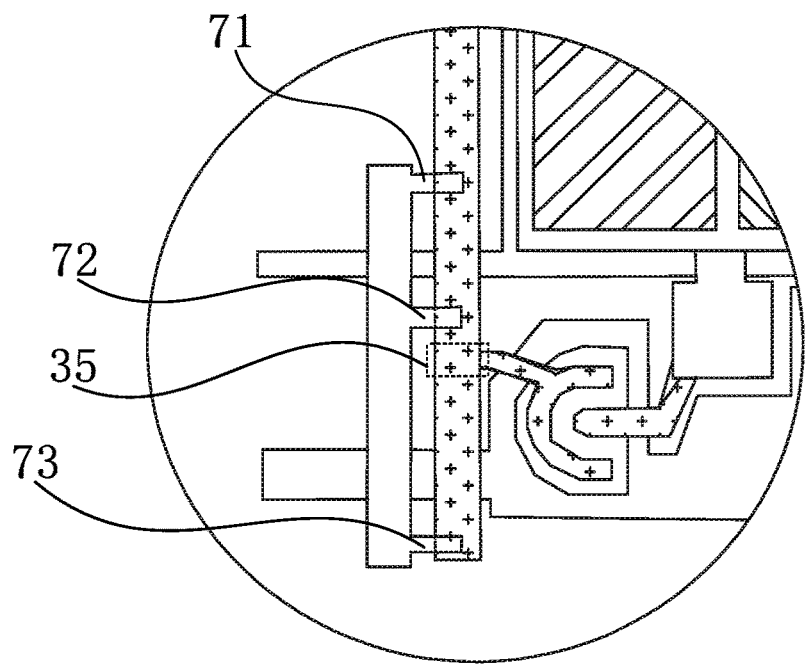
FIG. 8 is a schematic diagram of another repair line according to an embodiment of the present application.

As shown in another structural diagram of a repair line 70 in FIG. 8, a first connection point 35 is located on the data line 30 and connected with the source electrode 21, and the first connection point 35 is located between the first overlapping area 80 and the second overlapping area 90; the second repair point 72 may overlap with the data line 30 in an area between the first overlapping area 80 and the first connection point 35.

Specifically, the second repair point 72 and the data line 30 overlap in an area between the first overlapping area 80 and the first connection point 35; the first branch line 32, the second branch line 33 and the third branch line 34 are led out from the data line main body 31 of the data line 30, and the second branch line 33 overlaps with the repair line 70; the first repair point 71, the second repair point 72 and the third repair point 73 are led out from the repair line main body 76 of the repair line 70, and the second repair point 72 overlaps with the data line 30.

The second repair point 72 and the data line 30 overlap in an area between the first overlapping area 80 and the first connection point 35, when the data line 30 and the common line 60 at the first overlapping area 80 are short-circuited, the first connection point 35 and the first overlapping area 80 can be cut off to form a first breakpoint 36, and at this time, the repair line 70 is electrically connected with the data line 30 by the second repair point 72, so that the repaired data line 30 can continuously charge for the corresponding pixel electrode 50; meanwhile, compared with the case that the second repair point 72 is connected between the first connection point 35 and the second overlapping area 90, and then the first breakpoint 36 is formed by cutting the second connection point and the first overlapping area 80, the length of the repair line 70 is shorter than that of the data line 30, so that the overall resistance value of the repaired data can be kept small. In addition, after repairing, if the first connection point 35 and the first overlapping area 80 are cut off to form the first breakpoint 36, the total length of the data line 30 plus the repair line 70 is shorter and the resistance value is small because the data line 30 and the repair line 70 have less repeated routing lengths.

Figure 9:
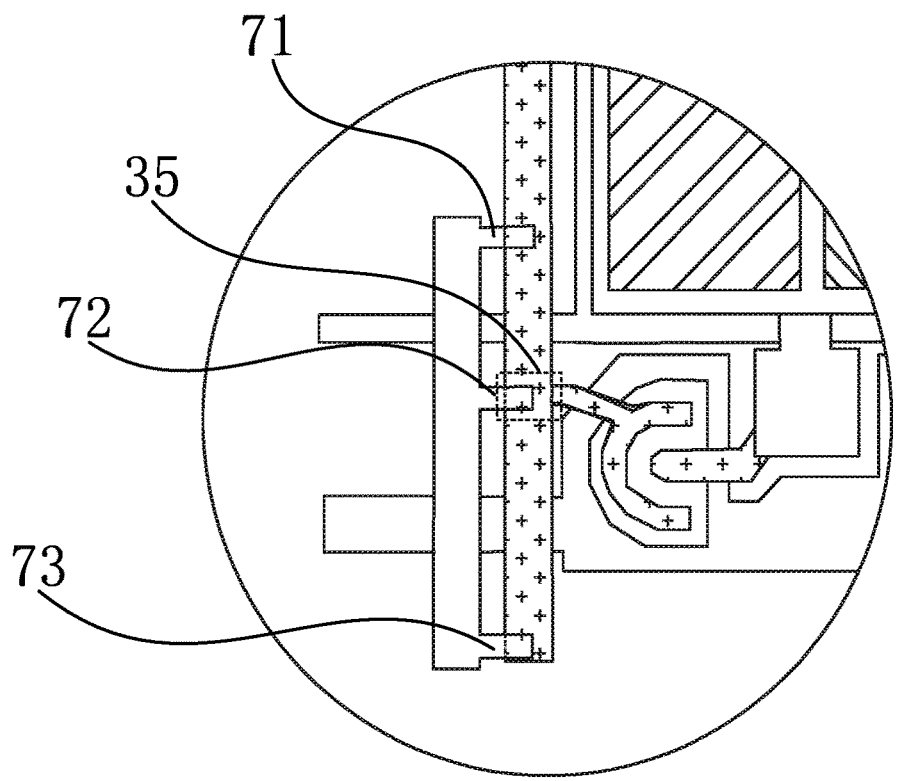
FIG. 9 is a schematic diagram of another repair line according to an embodiment of the present application.

As shown in another structural schematic diagram of a repair line 70 in FIG. 9, the second repair point 72 may also overlap with the first connection point 35.

The second repair point 72 overlaps with the first connection point 35, when the data line 30 and the common line 60 at the first overlapping area 80 are short-circuited, the first connection point 35 and the first overlapping area 80 can be cut off to form a first breakpoint 36, and at this time, the repair line 70 is electrically connected with the data line 30 by the second repair point 72, which ensures that the repaired data line 30 can continuously charge for the corresponding pixel electrode 50, and meanwhile, the total length of the data line 30 plus the repair line 70 is shorter and the resistance value is small because the data line 30 and the repair line 70 have greatly reduced repeated routing lengths.

As shown in another structural schematic diagram of a repair line 70 in FIG. 7, the second repair point 72 overlaps with the data line 30 between the first connection point 35 and the second overlapping area 90.

It should be noted that the repair line 70 may be an indium tin oxide (ITO) semiconductor transparent conductive film, so as to reduce the influence of the repair line on the light transmittance of the panel. At this time, the pixel electrode 50 can be formed in the same manufacturing process, thereby saving the process. The repair line 70 may be other conductive materials.

It should be noted that, the limitation of the steps involved in this solution, without affecting the implementation of the specific solution, is not determined to limit the sequence of steps, and the previous steps may be executed first, later, or even simultaneously, and shall be deemed to fall within the scope of the present application as long as the solution can be implemented.

The technical solution of the present application can be applied to a wide variety of display panels, such as Twisted Nematic (TN) display panels, In-Plane Switching (IPS) display panels, Vertical Alignment (VA) display panels, Multi-domain Vertical Alignment (MVA) display panels, and other types of display panels, such as Organic Light-Emitting Diode (OLED) display panels.

The above content is a further detailed description of the present application in conjunction with specific, optional embodiments, and it is not to be construed that specific embodiments of the present application are limited to these descriptions. For those of ordinary skill in the art to which this application belongs, a number of simple derivations or substitutions may be made without departing from the spirit of this application, all of which shall be deemed to fall within the scope of this application.

What is claimed is:

1. A display panel, comprising:
   a substrate;
   a plurality of active switches disposed on the substrate;
   a plurality of data lines disposed on the substrate and connected with source electrodes of the active switches;
   a plurality of scanning lines disposed on the substrate and connected with gate electrodes of the active switches;
   a plurality of pixel electrodes disposed on the substrate and connected with drain electrodes of the active switches;
   a plurality of common lines disposed on the substrate and overlapping the pixel electrodes, wherein each common line and the respective gate line are disposed on a same side of the respective pixel electrode, and wherein the common line is disposed between the respective pixel electrode and the respective gate line, and wherein each of the plurality of common lines overlaps the respective pixel electrode; and
   a plurality of repair lines disposed on the substrate;
   wherein insulation layers are formed between the repair line, the data line, the scanning line, and the common line, wherein each repair line is insulated from the respective data line by a corresponding intermediate insulation layer when the respective data line is not short-circuited with each of the respective common line and the respective gate line;
   wherein each data line overlaps the respective common line to form a first overlapping area, and the data line overlaps the respective scanning line to form a second overlapping area;
   wherein each repair line comprises a first repair point, a second repair point, and a third repair point overlapping the respective data line, wherein the first repair point is located on a side of the first overlapping area away from the second repair point, the second repair point is located between the first overlapping area and the second overlapping area, and the third repair point is located on a side of the second overlapping area away from the second repair point;
   wherein a first connection point is located on the data line and connected with the source electrode, and the first connection point is located between the first overlapping area and the second overlapping area; the second repair point overlaps the data line at a point between the first overlapping area and the first connection point;
   wherein in response to the data line being short-circuited with the respective gate line only at the second overlapping area, the data line is cut off at a first cutting point between the first connection point and the second overlapping area and further at a second cutting point between the second overlapping area and the third repair point, and the branch line is connected to the respective second branch line and the third branch line at the second repair point and the third repair point, respectively, thus allowing a data voltage transmitted on the data line to bypass the original portion of the data line between the first cutting point and the second cutting point and to be transmitted from the second repair point to the third repair point through the repair line, wherein the data voltage is also allowed to be transmitted through the original portion of the data line between the second repair point and the first connection point to the source electrode of the respective active switch.

2. The display panel according to claim 1, wherein the data line comprises a data line main body, a first branch line, a second branch line and a third branch line, wherein the first branch line, the second branch line and the third branch line are connected with the data line main body and each protrude from an edge of the data line main body at a same side of the data line main body away from the respective pixel electrode; wherein the first branch line is located on a side of the first overlapping area away from the second repair point, and corresponds to and overlaps the first repair point; the second branch line is located between the first overlapping area and the second overlapping area, and corresponds to and overlaps the second repair point; the third branch line is located on a side of the second overlapping area away from the second repair point, and corresponds to and overlaps the third repair point; wherein the data line main body is staggered with the repair line along a plane parallel to the display panel.

3. The display panel according to claim 1, wherein the repair line comprises a repair line main body connected with each of the first repair point, the second repair point and the third repair point; wherein the first repair point, the second repair point and the third repair point protrude from the repair line main body; the first repair point is located on a side of the first overlapping area away from the second repair point and overlaps the data line; the second repair point is located between the first overlapping area and the second overlapping area and overlaps the data line; the third repair point is located on a side of the second overlapping area away from the second repair point and overlaps the data line; wherein the data line is staggered with the repair line main body.

4. The display panel according to claim 1, wherein the width of the data line is the same as the width of the repair line.

5. The display panel according to claim 1, wherein the width of the repair line is greater than 4 μm.

6. The display panel according to claim 1, wherein the width of the repair line is smaller than the width of the data line.

7. The display panel according to claim 1, wherein the width of the repair line is greater than the width of the data line.

8. The display panel according to claim 1, wherein the repair line is an indium tin oxide semiconductor transparent conductive film.

9. The display panel according to claim 1, wherein the repair line overlaps the common line and the scanning line; an overlapping portion is an area where the repair line overlaps the common line and the scanning line, and a staggered portion is a non-overlapping area; wherein the width of the overlapping portion is smaller than the width of the staggered portion.

10. A repair method for a display panel, the display panel comprising:
a substrate;
a plurality of active switches disposed on the substrate;
a plurality of data lines disposed on the substrate and connected with source electrodes of the respective active switches;
a plurality of scanning lines disposed on the substrate and connected with gate electrodes of the respective active switches;
a plurality of pixel electrodes disposed on the substrate and connected with drain electrodes of the respective active switches;
a plurality of common lines disposed on the substrate and overlapping the respective pixel electrodes, wherein each common line and the respective gate line are disposed on a same side of the respective pixel electrode, and wherein the common line is disposed between the respective pixel electrode and the respective gate line, and wherein each of the plurality of common lines overlaps the respective pixel electrode; and
a plurality of repair lines disposed on the substrate;
wherein insulation layers are formed between the repair line, the data line, the scanning line, and the common line, wherein each repair line is insulated from the respective data line by a corresponding intermediate insulation layer when the respective data line is not short-circuited with each of the respective common line and the respective gate line;
wherein each data line overlaps the respective common line to form a first overlapping area, and the data line overlaps the respective scanning line to form a second overlapping area;
wherein each repair line comprises a first repair point, a second repair point, and a third repair point overlapping the respective data line, wherein the first repair point is located on a side of the first overlapping area away from the second repair point, the second repair point is located between the first overlapping area and the second overlapping area, and the third repair point is located on a side of the second overlapping area away from the second repair point;
wherein a first connection point is located on the data line and connected with the source electrode, and the first connection point is located between the first overlapping area and the second overlapping area; the second repair point overlaps the data line at a point between the second overlapping area and the first connection point;
wherein the repair method comprises:
detecting a position of a short-circuit point, wherein short-circuit point comprises at least one selected from the group consisting of the first overlapping area and the second overlapping area;
in response to detecting that the short-circuit point is at only the first overlapping area, cutting off the data line at a first cutting point between the first repair point and the first overlapping area and further at a second cutting point between the first overlapping area and the first connection point; and
electrically connecting the repair line to the first branch line and the second branch line at the first repair point and the second repair point, respectively, thus allowing a data voltage transmitted on the data line to bypass the original portion between the first cutting point and the second cutting point and to be transmitted from the first repair point, through the portion of the repair line between the first repair point and the second repair point, the portion of the data line between the second repair point and the first connection point, to be transmitted to the source electrode of the respective active switch and to also down to the lower portion of the data line.

11. The display panel according to claim 2, wherein each pixel electrode comprises a rectangular outer frame, and the respective common line comprises three segments which constitute a rectangle of which one side is removed; wherein the three segments of the common line respectively overlap three corresponding sides of the rectangular pixel electrode.

12. A repair method for a display panel, the display panel comprising:
- a substrate;
- a plurality of active switches disposed on the substrate;
- a plurality of data lines disposed on the substrate and connected with source electrodes of the respective active switches;
- a plurality of scanning lines disposed on the substrate and connected with gate electrodes of the respective active switches;
- a plurality of pixel electrodes disposed on the substrate and connected with drain electrodes of the respective active switches;
- a plurality of common lines disposed on the substrate and overlapping the respective pixel electrodes, wherein each common line and the respective gate line are disposed on a same side of the respective pixel electrode, and wherein the common line is disposed between the respective pixel electrode and the respective gate line, and wherein each of the plurality of common lines overlaps the respective pixel electrode; and
- a plurality of repair lines disposed on the substrate;

wherein insulation layers are formed between the repair line, the data line, the scanning line, and the common line, wherein each repair line is insulated from the respective data line by a corresponding intermediate insulation layer when the respective data line is not short-circuited with each of the respective common line and the respective gate line;

wherein each data line overlaps the respective common line to form a first overlapping area, and the data line overlaps the respective scanning line to form a second overlapping area;

wherein each repair line comprises a first repair point, a second repair point, and a third repair point overlapping the respective data line, wherein the first repair point is located on a side of the first overlapping area away from the second repair point, the second repair point is located between the first overlapping area and the second overlapping area, and the third repair point is located on a side of the second overlapping area away from the second repair point;

wherein a first connection point is located on the data line and connected with the source electrode, and the first connection point is located between the first overlapping area and the second overlapping area; the second repair point overlaps the data line at a point between the first overlapping area and the first connection point;

wherein the repair method comprises:

detecting a position of a short-circuit point, wherein short-circuit point comprises at least one selected from the group consisting of the first overlapping area and the second overlapping area;

in response to detecting that the short-circuit point is at only the second overlapping area, cutting off the data line at a first cutting point between the first connection point and the second overlapping area and further at a second cutting point between the second overlapping area and the third repair point; and electrically connecting the repair line to the second branch line and the third branch line at the second repair point and the third repair point, respectively, thus allowing a data voltage transmitted on the data line to bypass the original portion of the data line between the first cutting point and the second cutting point and to be transmitted from the second repair point to the third repair point through the repair line, wherein the data voltage is also allowed to be transmitted through the original portion of the data line between the second repair point and the first connection point to the source electrode of the respective active switch.

\* \* \* \* \*